Oct. 13, 1942.   W. L. HANSEN ET AL   2,298,373
SLOW SPEED SYNCHRONOUS MOTOR
Filed April 25, 1940
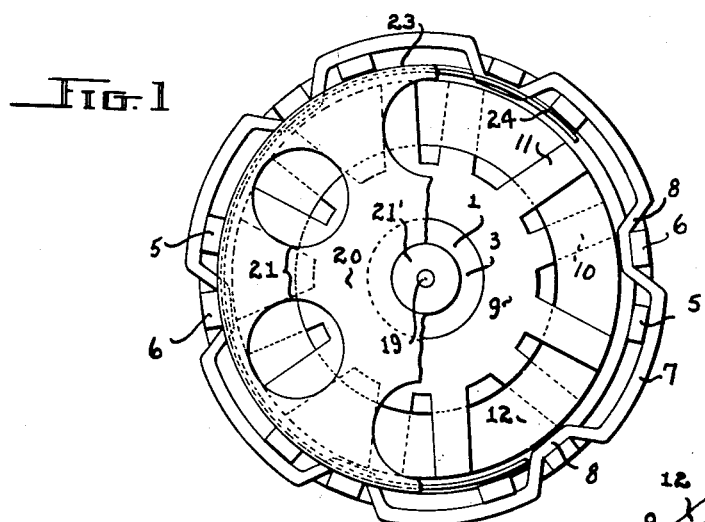
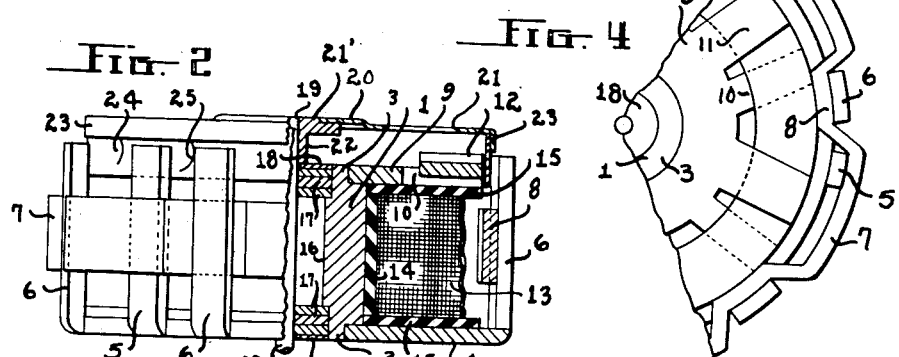
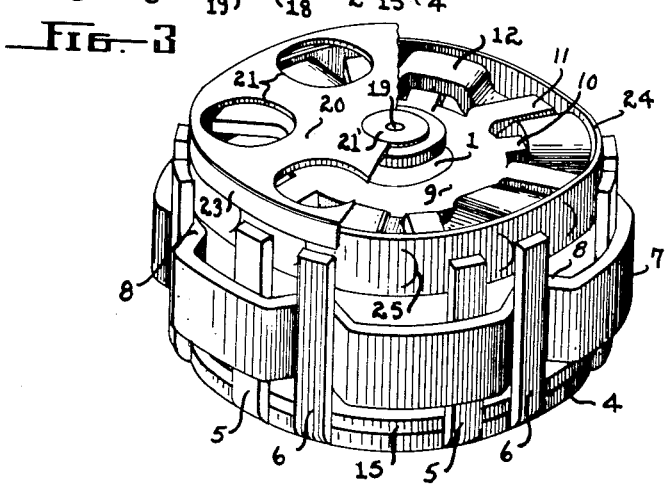
Inventors
WILLIAM L. HANSEN
IRA N. HURST
By Taulmin & Taulmin
Attorneys Patented Oct. 13, 1942

2,298,373

UNITED STATES PATENT OFFICE 2,298,373

SLOW SPEED SYNCHRONOUS MOTOR

William L. Hansen and Ira N. Hurst, Princeton, Ind., assignors to Hansen Mfg. Company, Inc., Princeton, Ind., a corporation of Indiana Application April 25, 1940, Serial No. 331,610

11 Claims. (Cl. 172—278)

This invention relates to electric motors and in particular, to electrical synchronous motors such as are employed for operating clocks.

There are a number of different types of clock motors on the market. In a certain type, the pole pieces of opposite polarity are brought close together so as to provide a relatively low reluctance path for leakage flux. In this case, the rotor intercepts only that flux which does not pass through the path of low reluctance.

In still another type of motor, these pole pieces which extend laterally or axially of the motor are taken alternately from opposite sides of the energizing coil and consequently are of opposite polarity. While motors of the two types mentioned are satisfactory we have found that a still better motor is obtainable by eliminating all or substantially all of the leakage flux and causing this flux to be intercepted by the rotor. We have further found that it is not necessary that the adjacent or alternate axial or lateral poles shall be of opposite magnetic polarity but instead may be formed in pairs of poles all of which have the same polarity.

Accordingly the primary object of the present invention is to provide an improved slow speed electrical synchronous motor and in particular to provide a motor of this character which has a relatively high starting torque as well as a relatively high operating torque.

Still another object is to provide a slow speed self-starting synchronous motor having a field structure consisting of two spaced poles coming from opposite ends of a field core, the inner set of poles consisting of a disc with radially projecting fingers and the outer set consisting of a disc with axially projecting fingers, the tips of the two sets of fingers being sufficiently wide apart to eliminate substantial leakage of flux and yet sufficiently close to a rotor as to cause practically all of the flux passing between the poles to go through the rotor.

Thus the general object is to provide a slow speed synchronous motor in which practically all of the flux or magneto motive force generated by the exciting coil is employed either in starting the rotor or thereafter causing the rotor to revolve at synchronous speed.

The above objects are attained in brief by providing a two-sectioned magnetic structure in which one of the sections comprises radially extending pole pieces and the other section comprises laterally extending pole pieces and positioning the last mentioned pole pieces external to the tips of the radially extending pole pieces to leave an annular gap in which the movable element rotates. Thus the rotor is interposed between the two magnetic sections and is so positioned as to receive and intercept practically all of the flux which passes between the pole pieces.

Other objects and features will be apparent as the specification is perused in connection with the accompanying drawing.

In the drawing:

Figure 1 is a top plan view of the motor of this invention with portions of the rotor structure and field coil structure broken away respectively to disclose the structure therebeneath.

Figure 2 is a side elevation of the motor shown in Figure 1 with the rotor structure shown in diametrical cross section in order to disclose the field structure more clearly.

Figure 3 is a top perspective view of the motor shown in Figures 1 and 2 with the rotor structure broken away and in section.

Figure 4 is a fragmentary view of a modified form of the magnetic structure which may be employed in connection with the motor shown in Figures 1 to 3.

Referring to the drawing in detail numeral 1 designates a magnetic tubular hub having reduced diameter portions 2, 3 and upon which are mounted the outer and inner field pole assemblies. The outer field pole structure consists of a disc 4 having an aperture by which it is mounted on the reduced diameter portion 2 of the hub 1 and having axially directed pole pieces 5, 6 disposed alternately in a cylindrical path around the hub 1. The pole pieces 5, 6 are preferably not equidistantly spaced about the disc 4 but instead are arranged in pairs around the periphery of the disc as can best be seen in Figure 3.

The alternate pole pieces 5, 6 are shaded by an undulating ring 7 of nonmagnetic material, such as copper. This undulating ring 7 passes over the outer surfaces of the pole pieces 5 and therefore does not shade them. The shading ring 7, however, is provided with undulating portions 8 passing around three sides of the pole pieces 6 thereby shading these pole pieces and providing a phase lag when the field structure is magnetized by an alternating flux.

The inner field pole assembly consists of a disc portion 9 having an aperture by which it is mounted on the reduced diameter portion 3 of the hub 1. This disc is provided with pole pieces 10, 11 which extend practically radially from the disc and are arranged in pairs around the periphery of the disc. The pole pieces 10, 11 do not extend as far as the pole pieces 5, 6 but instead are cut short so as to leave an annular space between the tips of the pole pieces 10, 11 and the inner peripheral surface of the pole pieces 5, 6. The width of this annular space is such as to accommodate the thickness of a rotor.

It will be noted from the drawing that the radial pole pieces 11, 10 are not in line with the axial pole pieces 5, 6 but that the pole piece 11 is positioned at an angle in the clockwise direction with respect to the pole piece 5 and the pole piece 10 is positioned at a similar angle but measured in the counterclockwise direction with respect to the pole piece 6. In other words the radial pole pieces 11, 10 are positioned intermediate the axial pole pieces 5, 6. It will be further apparent that the upper edge of the right-hand group of pole pieces 11 as seen in Figure 1 is practically in line with the lower edge of the adjacent pole pieces 5 and that the lower edge of the corresponding pole pieces 10 is in line with the upper edge of the adjacent pole pieces 6. The angle by which the pole pieces 11, 10 either follow or precede their adjacent pole pieces 5, 6 constitutes a so-called "lead" angle which serves to assist in the creation of a rotating field and determines the direction in which the field rotates. It will be understood in this connection that the pole pieces 11, 10 do not necessarily have to have the relative positions shown on the drawing to the adjacent pole pieces 5, 6 but may be moved in closer alignment with the last mentioned pole pieces if desired or still further out of alignment than in the position shown in Figure 1. These positions are subject to experiment and adjustment depending on the compromise desired between the starting and operating torques and also on the use to which the motor is put. However, in general we have obtained very satisfactory results when the radial pole pieces 11, 10 have approximately the relative positions shown on the drawing with respect to the axial pole pieces 5, 6.

The pole pieces 11 which alternate with the pole pieces 10 are shaded by an undulating ring 12 of nonmagnetic metal such as copper, this shading ring having undulating portions passing around three sides of each of the pole pieces 11 so as to shade these pole pieces. However, the shading ring 12 merely passes across the front face of each pole piece 10 and therefore does not shade it. As can be seen on the drawing this shading ring has considerable width measured in the radial direction so that the pole pieces 10, 11 are likewise provided with considerable length in order to accommodate the shading ring.

The field structure formed by the radial pole pieces 10, 11 and the axial pole pieces 5, 6 is magnetized by a field coil 13 wound on a drum 14 of insulating material and contained between a pair of webs 15 also of insulating material. The drum 14 is mounted on the hub 1 and secured thereto in any suitable and well known manner. There are a pair of leads (not shown) connected to opposite ends of the coil 13 and adapted to be connected to a suitable source of alternating current. The magnetic hub 1 is provided with an axial bore 16 closed at each end by the plug washers 17 which carry a thrust washer 18. The washers 17 and 18 having an opening at the center which receives the shaft 19 of a rotating disc 20 made of a light metal such as aluminum and provided with a number of equidistantly spaced large openings 21. These openings are provided mainly to cut down the weight of the metal. The disc 20 is secured to the shaft 19 preferably through a hub member 21' which has a downwardly extending collar 22, bearing against the upper thrust washer 18. The space within the bore 16 and between the shaft 19 and the inner washers 17 may be filled with a liquid lubricant although we prefer to place within this space a material such as wicks or waste saturated with a lubricant. The disc 20 terminates in a peripheral flange 23 which receives the rotor 24 in the form of a cylindrical band of hardened magnetic steel.

The rotor 24 is preferably radially thin and axially wide, light in weight and in a single piece. The band may either be continuous or may consist of a strip of magnetic steel which is bent into circular form and sprung into place within the flange 23. The band preferably has a smooth finish or may be provided with circumferentially spaced ridges or protuberances extending outwardly from the surface of the band. However, we prefer to employ a rotor of the type which is disclosed and claimed in our copending application Serial No. 282,719 filed July 3, 1939, now Patent No. 2,237,961, patented April 8, 1941, and assigned to the same assignee as the present invention. The rotor band 24 is provided with circumferentially spaced incisions 25 preferably as many as there are pairs of poles and equidistantly spaced which incisions serve to interrupt the magnetic path and in this manner to provide pole pieces around the rotor band. In order to insure a complete interruption of the magnetic path within the band these incisions must quite definitely pass through the rotor material and for this reason we prefer to form the incisions while the rotor material is in a flat condition and then to strike up the metal about each incision, finally bending the metal back to its original shape. After the strip has been hardened in a suitable and well known manner it is sprung into place within the flange 23 where it is firmly held due to the resilience of the metal.

Other forms of rotors which may be employed are those shown in our copending application Serial No. 282,718 filed July 3, 1939, now Patent No. 2,283,363, patented May 19, 1942, in which one edge of the band is provided with scallops with an opening in each scalloped portion.

The length of the rotor band 24 should preferably be such as to extend somewhat beyond the entire distance between the upper and lower edges of the radially extending pole pieces 10, 11, in other words, the width of the band should be greater than the thickness of the pole pieces 10, 11 and extend above the upper and lower surfaces of these pole pieces. This is clearly shown in Figure 2. It should also be noted in this figure that the axial pole pieces 5, 6 extend somewhat beyond the upper surfaces of the radial pole pieces 10, 11.

In the fabrication of the improved motor the first step is to mount the coil 13 on the hub 1 after which the discs 9 and 4 are placed in position on the hub. The axial pole pieces 5 are preferably stamped integral with the disc 4 and leave the press in a flat condition. The pole pieces 5, 6 are then bent upwardly by passing through a suitable die after which the shading ring 7 is pressed downwardly into position. In mounting the other shading ring 12 the pole pieces 11 of the disc 9 are first bent upwardly in the vertical direction so that the shading ring may be placed in position after which these pole pieces are bent downwardly to their horizontal position, thus holding the shading ring firmly in place. After the various parts have been assembled in the manner described it is only necessary to peen over the metal at the opposite ends of the hub 1 so as to hold the discs 9 and 4 securely in place. It is apparent that the fabrication of the improved motor is quite simple and inexpensive and it is further evident that the shading rings 7, 12 are held rigidly in place by the pole pieces without the necessity of any other securing means.

In the operation of the motor shown in Figures 1 to 3 the field coil 13 is energized by connecting its leads to a suitable source of alternating current, such as the ordinary house wiring circuit of 110 volt, 60 cycle alternating current. The alternations of the current alternately magnetize the field poles with opposite polarities but the shaded field poles undergo a phase lag relatively to the unshaded poles so that a starting force is applied to the rotor 24, causing it to rotate on its shaft 19. The motor shaft 19 is preferably connected to reduction gearing (not shown) by which its speed is reduced to the one R. P. M. speed ordinarily employed in driving electrical synchronous clocks.

It is apparent that the pole pieces 5 for example, which extend from the lower end of the coil 13 will have an instantaneous magnetic polarity opposite from the adjacent pole pieces 11 which extend from the top of the coil 13. The flux passing between the pole pieces 5, 11, also between the pole pieces 6, 10, is necessarily intercepted by the rotor 24 because the latter is interposed between the pole pieces and extends considerably above and below these pole pieces. Consequently, all leakage or non-useful flux is eliminated and all of that part of the electrical energy supplied to the coil 13 which is transformed into flux is applied directly to the rotor, thus giving to the latter a strong starting and operating torque.

It is also evident that the adjacent radial poles 10, 11 are of the same magnetic polarity except for the phase lag introduced by the shading ring 12 and the axial poles 5, 6 are similarly of the same magnetic polarity except for the phase lag introduced by the shading ring 7. Therefore, there is practically no flux leakage between the adjacent radial poles or between the adjacent axial poles. This absence of leakage flux between all of the poles of our improved motor and the complete utilization by the rotor of the flux passing between pole pieces of opposite polarity are so pronounced that a motor of this invention which, in the form shown, has a speed of 600 R. P. M. possesses an unusual low current consumption, less than 3 watts as compared with prior art motors having current consumption running as high as 6 watts. At the same time, the motor possesses extremely large starting and operating torques.

In the modified form of the magnetic field structure shown in Figure 4 the shaded poles 11 which radiate from the disc 9 are made somewhat wider than the adjacent unshaded poles 10. Similarly the shaded poles 6 which extend axially of the motor are made somewhat wider than the adjacent unshaded poles 5. The purpose of widening the shaded portions of the radially extending or the axially extending pole pieces or both is to provide a greater cross sectional area of metal through which the flux passes. It will be understood that the effect of the shading ring 12 is to induce a flux in the shaded pole pieces 11 which opposes the flux produced therein by the coil 13. Thus the net flux flowing through the pole piece 11 in any one direction is less than the flux flowing through the adjacent pole piece 10. However, due to the widening of the shaded pole pieces 11, the cross sectional area is correspondingly increased over the corresponding area of the pole pieces 10 so that the permeability of the metal in the pole pieces 11 is greater than the permeability offered by the pole pieces 10. The instantaneous differences of flux passing through the pole pieces 10, 11 is thereby reduced in accordance with these changes of permeability. The effect of widening the shaded pole pieces 6 is the same as that described in connection with the shaded pole pieces 11 in that greater permeability or less reluctance is presented to the smaller flux flowing in any one direction through the pole pieces 6 than is offered to the flux flowing through the unshaded pole pieces 5. While in Figure 4 we have shown the feature of widening the shaded pole pieces of both the radial as well as the axial portions of the magnetic structure it will be understood that if desired only one portion, i. e., either the radial or the axial portions may be so widened. It will be further understood that any other expedient may be employed to either cause greater reluctance in the unshaded pole pieces or less reluctance in the shaded pole pieces.

Having thus fully described our invention, what we claim as new and desire to secure by Letters Patent, is:

1. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips spaced from the tips of the axial pole pieces to leave a continuous annular opening between the pole tips, a rotor positioned within said annular opening, and a shading ring positioned adjacent to and intertwining said outer pole pieces and arranged to shade alternate outer pole pieces.

2. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips spaced from the tips of the axial pole pieces to leave a continuous annular opening between the pole tips, a rotor positioned within said annular opening, and a shading ring positioned adjacent to and intertwining said outer pole pieces and arranged to shade alternate outer pole pieces, and a shading ring positioned adjacent to and intertwining said inner pole pieces and arranged to shade alternate inner pole pieces.

3. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially, the radial pole pieces being separated from the axial pole pieces to leave a continuous annular space of sufficient width to receive a rotor, said inner pole pieces being out of line with the outer pole pieces, one of the edges of the alternate radial pole pieces being in line with one of the edges of the adjacent axial pole pieces, and the opposite edge of the remaining radial pole pieces being in line with the opposite edge of the remaining axial pole pieces and a shading ring of annular ribbon form passing alternately from outside to inside of adjacent outer pole pieces and arranged to shade alternate outer pole pieces.

4. In a synchronous motor, a magnetic core, a magnetic field member mounted on one end of said core and having outer pole pieces disposed axially in a substantially cylindrical path, said axial pole pieces being arranged in pairs about said field member, the distances between the center lines of the adjacent pairs of pole pieces all being equal, a second magnetic field member mounted on the other end of said core and having inner pole pieces disposed radially, said inner pole pieces radiating from a disc and so positioned that one inner pole piece extends to one side of a given pair of axial pole pieces and the adjacent inner pole piece extends to the other side of said pair of axial pole pieces, the tips of all of the radial pole pieces being spaced a distance from the axial pole pieces to leave a continuous annular opening adapted to receive a rotor.

5. In a synchronous motor, a magnetic core, a magnetic field member mounted on one end of said core and having outer pole pieces disposed axially in a substantially cylindrical path, said axial pole pieces being arranged in pairs about said field member, the distances between the center lines of the adjacent pairs of pole pieces all being equal, a second magnetic field member mounted on the other end of said core and having inner pole pieces disposed radially, said inner pole pieces radiating from a disc and so positioned that one inner pole piece extends to one side of a given pair of axial pole pieces and the adjacent inner pole piece extends to the other side of said pair of axial pole pieces, the tips of all of the pole pieces being spaced a distance to leave a continuous annular opening adapted to receive the peripheral portion of a rotatable element, a band of magnetic material secured to said portion and having such a width and being so positioned with respect to the pole tips as to intercept substantially all of the flux passing between pole tips of opposite polarity, and a shading member of an undulating ribbon-like configuration intertwining the cylindrical path of said outer pole pieces and arranged to shade alternate outer pole pieces.

6. In a synchronous motor, a magnetic core, a magnetic field member mounted on one end of said core and having outer pole pieces disposed axially in a substantially cylindrical path, said axial pole pieces being arranged in pairs about said field member, the distances between the center lines of the adjacent pairs of pole pieces all being equal, a second magnetic field member mounted on the other end of said core and having inner pole pieces disposed radially, said inner pole pieces radiating from a disc and so positioned that one inner pole piece extends to one side of a given pair of axial pole pieces and the adjacent inner pole piece extends to the other side of said pair of axial pole pieces, the tips of all the pole pieces being spaced a distance to leave a continuous annular opening adapted to receive the peripheral portion of a rotatable element, a band of magnetic material secured to said portion and having such a width and being so positioned with respect to the pole tips as to intercept substantially all of the flux passing between pole tips of opposite polarity, and a shading ring of an undulating ribbon-like configuration intertwining the cylindrical path of said outer pole pieces and arranged to shade alternate outer pole pieces, and a second shading ring intertwining said inner pole pieces and arranged to shade alternate inner pole pieces.

7. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips spaced from the tips of the axial pole pieces to leave a continuous annular opening between the pole tips, a rotor positioned within said annular opening, and a shading ring positioned adjacent to and intertwining said outer pole pieces and arranged to shade alternate outer pole pieces, said alternate outer pole pieces having a larger cross-sectional area than the remaining outer pole pieces.

8. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially, the radial pole pieces being separated from the axial pole pieces to leave a continuous annular space of sufficient width to receive a rotor and a shading ring positioned adjacent to and intertwining said inner pole pieces and intertwining the same to shade alternate inner pole pieces, said alternate inner pole pieces having a larger cross-sectional area than the remaining inner pole pieces.

9. In a synchronous motor, a magnetic core, a magnetic field member mounted on one end of said core and having outer pole pieces disposed axially in a substantially cylindrical path, said pole pieces being arranged in pairs with a greater angular distance between pairs than between the pole pieces of each pair, a second magnetic field member mounted on the other end of said core and having inner pole pieces disposed radially with their tips spaced from the tips of the axial pole pieces to leave a continuous annular opening between the pole tips, said inner pole pieces being arranged in pairs with a greater angular distance between pairs than between the pole pieces of each pair, a rotor positioned within said annular opening and means for producing a magnetic field in said field members.

10. In a synchronous motor, a magnetic core, a magnetic field member mounted on one end of said core and having outer pole pieces disposed axially in a substantially cylindrical path, said pole pieces being arranged in pairs with a greater angular distance between pairs than between the pole pieces of each pair, a second magnetic field member mounted on the other end of said core and having inner pole pieces disposed radially with their tips spaced from the tips of the axial pole pieces to leave an annular opening between the pole tips, said inner pole pieces being arranged in pairs with a greater angular distance between pairs than between the pole pieces of each pair, the angular distance between the inner pole pieces of each pair being less than the angular distance between each pair of outer pole pieces, the outer edges of each pair of inner pole pieces being approximately in line with the outer edge of one pole piece of each pair of outer pole pieces and also in line with the outer edge of one pole piece of the adjacent pair of outer pole pieces, a rotor positioned within said annular opening and means for producing a magnetic field in each of said field members.

11. In a synchronous motor, a magnetic core, a magnetic field member mounted on one end of said core and having outer pole pieces disposed axially in a substantially cylindrical path, said pole pieces being arranged in pairs with a greater angular distance between said pairs than between the pole pieces of each pair, a second magnetic field member mounted on the other end of said core and having inner pole pieces disposed radially with their tips spaced from the tips of the axial pole pieces to leave an annular opening between the pole tips, said inner pole pieces being arranged in pairs which are positioned with respect to the pairs of outer pole pieces such that radial lines drawn through the middle of each inner pole piece intercept said cylindrical path of outer pole pieces at positions between adjacent pairs of outer pole pieces, a rotor positioned within said annular opening and means for producing a magnetic field in said field members.

WILLIAM L. HANSEN.
IRA N. HURST.